US012583728B2

(12) United States Patent
Kim et al.

(10) Patent No.: US 12,583,728 B2
(45) Date of Patent: Mar. 24, 2026

(54) TANK HAVING INTEGRATED INSULATION STRUCTURE

(71) Applicant: COWAY Co., Ltd., Gongju-si (KR)

(72) Inventors: Kyu-Jun Kim, Seoul (KR); Sang-Gu Sim, Seoul (KR); Sung-Jin Kim, Seoul (KR); Sang-Woo Bang, Seoul (KR); An-Ho Cho, Seoul (KR); Chan-Jung Park, Seoul (KR)

(73) Assignee: COWAY Co., Ltd., Gongju-si (KR)

( * ) Notice: Subject to any disclaimer, the term of this patent is extended or adjusted under 35 U.S.C. 154(b) by 435 days.

(21) Appl. No.: 18/040,568

(22) PCT Filed: Jul. 5, 2021

(86) PCT No.: PCT/KR2021/008520
§ 371 (c)(1),
(2) Date: Feb. 3, 2023

(87) PCT Pub. No.: WO2022/050550
PCT Pub. Date: Mar. 10, 2022

(65) Prior Publication Data
US 2023/0278848 A1 Sep. 7, 2023

(30) Foreign Application Priority Data
Sep. 2, 2020 (KR) ........................ 10-2020-0111941

(51) Int. Cl.
*B67D 1/08* (2006.01)
*C02F 1/00* (2023.01)

(52) U.S. Cl.
CPC ............ *B67D 1/0804* (2013.01); *C02F 1/001* (2013.01); *B67D 2210/0001* (2013.01); *B67D 2210/00044* (2013.01)

(58) Field of Classification Search
CPC .......... B67D 1/0804; B67D 2210/0001; B67D 2210/00044; B67D 2001/0093;
(Continued)

(56) References Cited

U.S. PATENT DOCUMENTS

| | | | | |
|---|---|---|---|---|
| 3,445,052 A | * | 5/1969 | Lewallen | E05D 1/02 |
| | | | | 16/385 |
| 4,235,346 A | * | 11/1980 | Liggett | B65D 1/225 |
| | | | | 220/675 |

(Continued)

FOREIGN PATENT DOCUMENTS

| | | |
|---|---|---|
| JP | 2009-162402 A | 7/2009 |
| KR | 10-2004-0009019 A | 1/2004 |

(Continued)

OTHER PUBLICATIONS

International Search Report issued in PCT/KR2021/008520, filed on Jul. 5, 2021, 2 pages.

*Primary Examiner* — Kareen K Thomas
(74) *Attorney, Agent, or Firm* — Oblon, McClelland, Maier & Neustadt, L.L.P.

(57) ABSTRACT

A tank having an integrated insulation structure includes a tank body having an accommodating space formed therein; a foamed case surrounding the outer peripheral surface of the tank body; and a foamed insulation material formed by a foaming agent expanding after being introduced into a space between the outer peripheral surface of the tank body and the foamed case. The foamed insulation material is integrated with the tank body and the foamed case through foaming, the foamed case includes a plurality of parts surrounding the tank body, and at least some of the plurality of parts having a structure manufactured in a planar figure shape to be foldable thereafter so as to correspond to the exterior of the tank body.

7 Claims, 23 Drawing Sheets

(58) Field of Classification Search
CPC ........ B67D 2210/00062; B67D 1/0078; B67D
1/07; B67D 2001/0828; B67D 1/0021;
B67D 1/0462; B67D 1/0884; B67D
1/0888; B67D 1/0892; B67D 1/1252;
B67D 1/0081; C02F 1/001; B29L
2031/34; B29L 2031/3412; B29C 45/00;
B29C 45/0053
See application file for complete search history.

(56) References Cited

U.S. PATENT DOCUMENTS

| | | | | |
|---|---|---|---|---|
| 4,700,862 A * | 10/1987 | Carter | ............... | B65D 11/1846 |
| | | | | 229/198.2 |
| RE37,696 E * | 5/2002 | Parker | ................. | B67D 3/0009 |
| | | | | 62/3.63 |
| 8,348,087 B2 * | 1/2013 | Sawaki | ............. | B65D 81/3855 |
| | | | | 220/666 |
| 2007/0108056 A1 * | 5/2007 | Nyberg | ................. | B01D 61/54 |
| | | | | 204/554 |
| 2010/0326985 A1 * | 12/2010 | Lin | ........................ | B65D 29/02 |
| | | | | 220/6 |
| 2011/0147194 A1 * | 6/2011 | Kamen | .................. | B67D 1/165 |
| | | | | 202/262 |
| 2012/0000954 A1 * | 1/2012 | Shea | .................. | B65D 81/3823 |
| | | | | 220/6 |
| 2013/0062356 A1 * | 3/2013 | Deka | .................. | B65D 81/3823 |
| | | | | 220/592.25 |
| 2013/0146096 A1 * | 6/2013 | Pickett | .................. | B08B 9/0321 |
| | | | | 134/22.12 |
| 2014/0144820 A1 * | 5/2014 | Early | .................... | C02F 3/1242 |
| | | | | 210/197 |
| 2017/0050837 A1 | 2/2017 | Kim | | |
| 2017/0341921 A1 * | 11/2017 | Cummer | ............. | B67D 1/0882 |
| 2018/0328648 A1 | 11/2018 | Adachi et al. | | |
| 2020/0080755 A1 | 3/2020 | Jung et al. | | |

FOREIGN PATENT DOCUMENTS

| | | | |
|---|---|---|---|
| KR | 10-2017-0022775 A | | 3/2017 |
| KR | 10-2018-0119251 A | | 11/2018 |
| KR | 10-2037044 B1 | | 10/2019 |

* cited by examiner

"V"

E–E'

F-F'

S100

100

TANK HAVING INTEGRATED INSULATION STRUCTURE

TECHNICAL FIELD

The present disclosure relates to a tank having an integrated insulation structure in which an insulation material and a tank body are integrated and a manufacturing method thereof.

BACKGROUND ART

Water purifiers have a device for filtering harmful elements, such as foreign substances or heavy metals, contained in water, and water ionizers or water softeners belong to water purifiers in a broad sense. Such a water purifier may be configured to provide hot water and/or cold water, and to this end, the water purifier includes a heating device and/or a cooling device (cold water generating unit).

The cold water generating unit uses a tank cooling method in which water stored in a cold water tank is directly cooled by an evaporation pipe (an evaporator) to generate cold water, or uses an ice thermal storage method in which an evaporation pipe (an evaporator) in which refrigerant flows and a cold water pipe in which purified water flows are installed inside an ice storage tank, an ice storage liquid stored in the ice storage tank is cooled by the evaporator pipe (the evaporator), and the cooled ice storage liquid or ice storage ice and purified water flowing through the cold water pipe are heat-exchanged so that the cold water is discharged through the cold water pipe. To this end, an evaporation pipe (evaporator) is connected to a compressor, condenser, and expansion valve to form a refrigerating cycle.

Meanwhile, since a temperature of the cooling tank provided in the cold water generating unit and accommodating cold water (purified water or ice storage liquid) is low, the cooling tank may be heat-exchanged with the outside to increase the temperature of the water accommodated therein and form dew condensation (condensed water) on a surface of the tank body. In particular, when dew condensation occurs, mold may easily grow on the surface of the tank body due to mold spores in the air, which often gives users an unpleasant feeling.

In order to secure such cooling performance and/or anti-dew condensation performance, an insulation material (cold insulation material) is often installed on the surface of the tank body. In many cases, such an insulation material is manufactured separately from expandable polystyrene (EPS, styrofoam) to have a shape corresponding to the shape of the surface of the tank body and is attached to the surface of the cooling tank.

However, in the case of these EPS insulation materials, since they are manufactured separately and attached to the tank body, a gap may be formed between the cooling tank and the EPS insulation material through which outside air may permeate, so that insulation performance (cooling performance) is not sufficient, and dew condensation (condensed water) may be formed on the surface of the tank body and outside air may penetrate through the dew condensation portion to result in an environment in which molds may easily grow.

In order to solve the problems of the EPS insulator, recently, a nude foaming method of directly forming a foamed insulation material on the surface of the tank body may be used. Korean Patent Laid-open Publication No. 2017-0022775 proposes a nude foaming method in which a foamed insulation material formed of polyurethane is formed on an outer circumferential surface of a cold water tank assembly by inserting a cold water tank assembly into a foaming jig and then performing a foaming process.

However, in the nude foaming process, a foamed surface is not clean because the foamed insulation material is formed between the surface of the foaming jig (or vinyl provided on the surface of the foaming jig) and the cold water tank assembly, and a lot of foaming powder may be formed in post-treating, such as an operation of mapping the foamed surface or removing the vinyl, so that foaming powder, which is an impurity, may remain inside the tank. In particular, in the nude foaming process, since the foamed insulation material is directly exposed to the air, air may move through fine pores formed in the foamed insulation material. Therefore, in the foamed insulation material based on the nude foaming process, when mold grows in the pores, it may be difficult to remove the mold, and the mold may continue to spread into the foamed insulation material through the pores of the foamed insulation material, causing discomfort to the user and sanitary problems.

In particular, in the case of the nude foaming process, mold and the like may proliferate on the foamed insulation material, and in a device for storing drinking water that a user drinks, such as a water purifier, the growth of mold causes many sanitary problems.

(Patent Document 1) KR2017-0022775 A

DISCLOSURE

Technical Problem

An aspect of the present disclosure is to provide a tank having an integrated insulation structure capable of sufficiently securing dew condensation performance and insulation performance and improving hygiene by preventing the growth of mold and the like, and a water purifier including the same Another aspect of the present disclosure is to provide a tank having an integrated insulation structure for integrating an insulation material even for a tank body having a complicated shape, and a water purifier including the same.

Another aspect of the present disclosure is to provide a tank having an integrated insulation structure capable of minimizing leakage of a foaming agent to the outside, and a water purifier including the same.

Another aspect of the present disclosure is to provide a tank having an integrated insulation structure capable of minimizing an unfoamed region and a water purifier including the same.

Another aspect of the present disclosure is to provide a tank having an integrated insulation structure that is easy to manufacture and a water purifier including the same.

Another aspect of the present disclosure is to provide a cooling tank that is easy to clean an outer surface and easy to remove condensation (condensed water).

Another aspect of the present disclosure is to provide a tank having an integrated insulation structure capable of minimizing contact between a tank body and an insulation material and external air, and a water purifier including the same.

Technical Solution

According to an aspect of the present disclosure, a tank having an integrated insulation structure includes: a tank body having an accommodating space formed therein; a foamed case surrounding an outer circumferential surface of the tank body; and a foamed insulation material formed as a foaming agent introduced to a foaming space between the outer circumferential surface of the tank body and the foamed case is foamed, wherein the foamed insulation material is integrated with the tank body and the foamed case through foaming, the foamed case includes a plurality of portions surrounding the tank body, and at least some of the plurality of portions has a structure manufactured in an unfolded view shape to be folded thereafter to correspond to the exterior of the tank body.

Advantageous Effects

As set forth above, according to an exemplary embodiment of the present disclosure, it is possible to sufficiently secure dew condensation performance and insulation performance, and accordingly, it is possible to obtain an effect of improving hygiene by preventing the growth of mold and the like. In particular, by preventing corrosion/contamination inside a water purifier, hygiene problems felt by the user may be solved.

In addition, according to an exemplary embodiment in the present disclosure, there is an effect that the insulation material may be integrated even for a tank body having a complicated shape.

Also, according to an exemplary embodiment in the present disclosure, it is possible to obtain the effect of minimizing leakage of a foaming agent to the outside.

In addition, according to an exemplary embodiment in the present disclosure, an effect of minimizing an unfoamed region may be obtained.

Also, according to an exemplary embodiment in the present disclosure, the tank having an integrated insulation structure may be easily manufactured even for a tank body having a complex structure.

In addition, according to an exemplary embodiment in the present disclosure, it is possible to obtain an effect that cleaning of the outer surface is easy and removal of dew condensation (condensed water) is easy.

Also, according to an exemplary embodiment in the present disclosure, there is an effect of minimizing contact between the tank body and the insulation material with external air.

Figure 1:
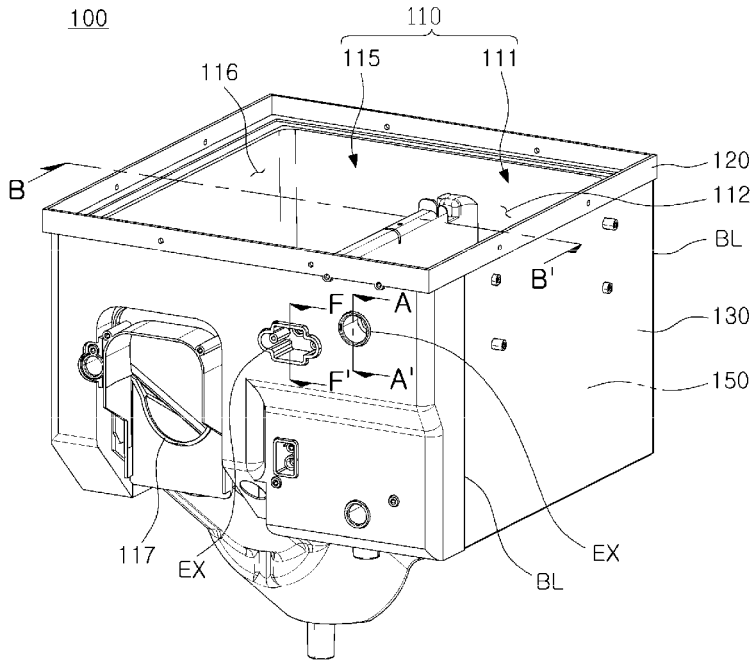
FIG. 1 is a perspective view of a tank having an integrated insulation structure according to an exemplary embodiment in the present disclosure.
Figure 2:
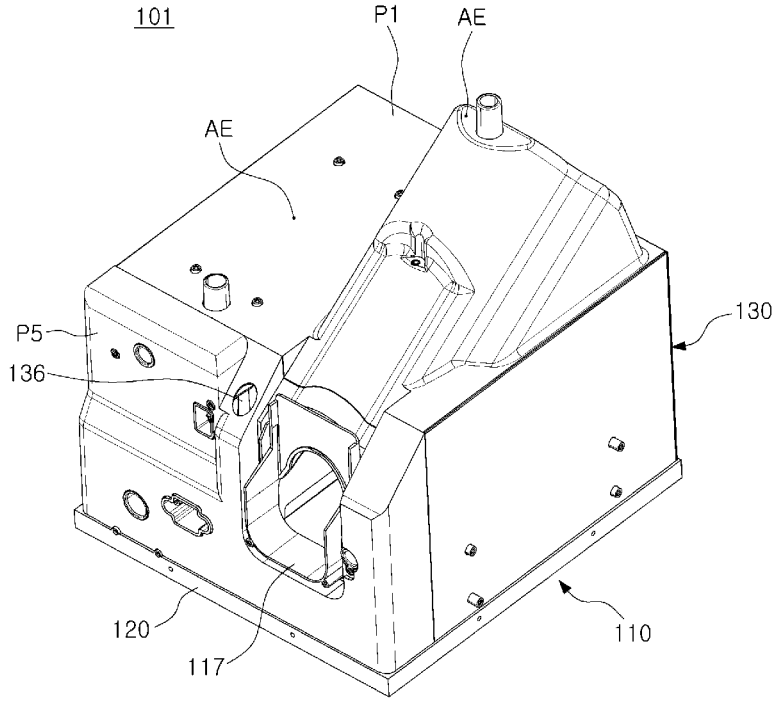
FIG. 2 is a bottom perspective view of a foaming assembly constituting the tank having an integrated insulation structure illustrated in FIG. 1.

| | * Description of reference numerals * | | |
|---|---|---|---|
| 100. | Tank having integrated insulation structure | 101. | foaming assembly |
| 110. | Tank body | 111. | Storage tank portion |
| 112. | Water storage space | 115. | Ice storage unit |
| 116. | Ice storage space | 117. | Ice outlet |
| 119. | Partition member | 120. | Tank rim |
| 130. | foamed case | 150. | Foamed insulation material |
| BL. | Boundary line | ET. | Extension |
| EX. | Exposed portion | FL. | Fold line |
| H. | Through-hole | P1. | First portion |
| P2. | Second portion | P3. | Third portion |
| P4. | Fourth portion | P5. | Fifth portion |
| PR. | Step | S. | Sealing member |
| SP. | Support portion | T. | Bonding member |
| TR. | Space portion | | |

BEST MODE FOR INVENTION

Hereinafter, exemplary embodiments in the present disclosure will be described in detail with reference to the accompanying drawings. The exemplary embodiments may, however, be exemplified in many different forms and should not be construed as being limited to the specific embodiments set forth herein. Rather, these embodiments are provided so that this disclosure will be thorough and complete, and will fully convey the scope of the inventive concept to those skilled in the art. In the drawings, the shapes and dimensions of elements may be exaggerated for clarity.

As used herein, the singular forms "a", "an," and "the" are intended to include the plural forms as well, unless the context clearly indicates otherwise, and throughout the specification, like reference numerals refer to like or corresponding element Hereinafter, exemplary embodiments in the present disclosure will be described with reference to the drawings.

[Tank Having Integrated Insulation Structure (100)]

Referring to FIGS. 1 to 10B, a tank 100 having an integrated insulation structure according to an exemplary embodiment in the present disclosure includes a tank body 110, a foamed case 130, and a foamed insulation material 150. In addition, the tank body 110 and the foamed case 130 are coupled to each other to form a foaming assembly 101 before a foaming agent (FAN in FIG. 18) is introduced.

Figure 7A:
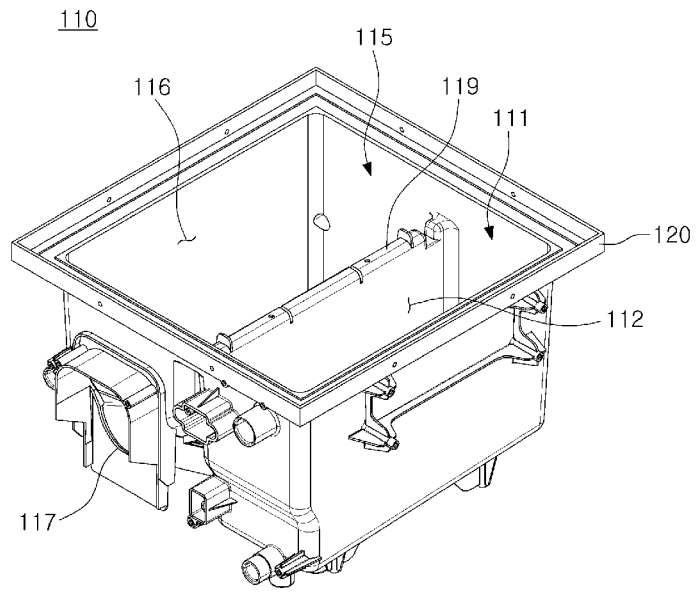
FIG. 7A is a perspective view illustrating a tank body in the tank having an integrated insulation structure illustrated in FIG. 1.
Figure 7B:
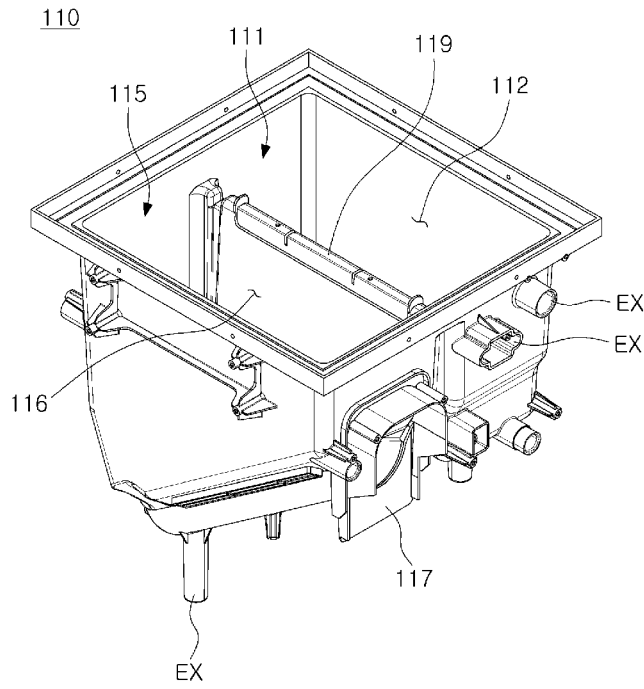
FIG. 7B is a perspective view illustrating the tank body illustrated in FIG. 7A from another angle.

Referring to FIGS. 1, 7A, and 7B, the tank body 110 includes an accommodating space formed therein. For example, the tank body 110 may include a storage tank unit 111 having a water storage space 112 accommodating purified water and an ice storage unit 115 having an ice storage space 116 accommodating ice. At this time, the storage tank unit 111 may be configured as a cold water tank unit cooling and storing purified water. In addition, the tank body 110 may include a partition member 119 partitioning the water storage space 112 and the ice storage space 116. The ice storage unit 115 may include an ice outlet 117 through which ice is extracted.

In addition, a tank rim 120 may be formed on an open upper portion of the tank body 110. The tank rim 120 may have a structure coupled to the foamed case 130, as will be described later.

As illustrated in FIG. 1, the tank body 110 has an exposed portion EX exposed to the outside in a state in which the foamed case 130 is covered. The exposed portion EX may include not only the ice outlet 117 but also a water outlet through which water flows in and out of the tank body 110, a portion for installing various electrical components, such as a temperature sensor or a water level sensor, and a fastening portion fastening the tank body 110 to a housing of the water purifier.

A tank cover (not illustrated) may cover the open upper portion of the tank body 110. In addition, a motor, a screw member, and a drain structure for ice ejection may be mounted in the ice outlet 117.

Next, referring to FIGS. 1 to 8, 9, 10A, and 10B, the foamed case 130 is configured to surround an outer circumferential surface of the tank body. At this time, since the open upper portion of the tank body 110 has a structure covered by the tank cover, the foamed case 130 has a structure covering the rest except for the upper surface of the tank body. For example, when the tank body 110 has an upper surface, a lower surface, and four side surfaces corresponding to a hexahedron, the foamed case 130 may cover the remaining five surfaces except for the upper surface.

Figure 5:
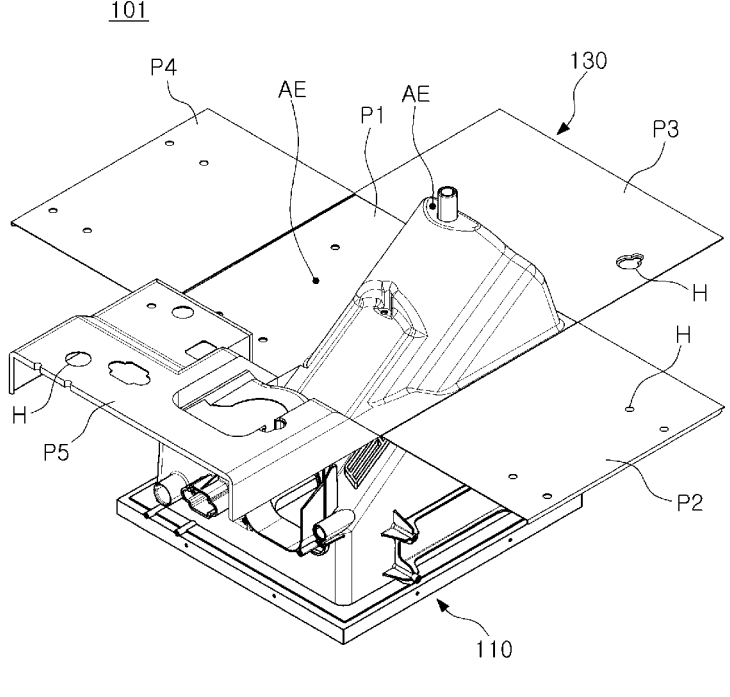
FIG. 5 is a perspective view illustrating a shape in which a foamed case in an unfolded shape covers a tank body in FIG. 2.
Figure 6:
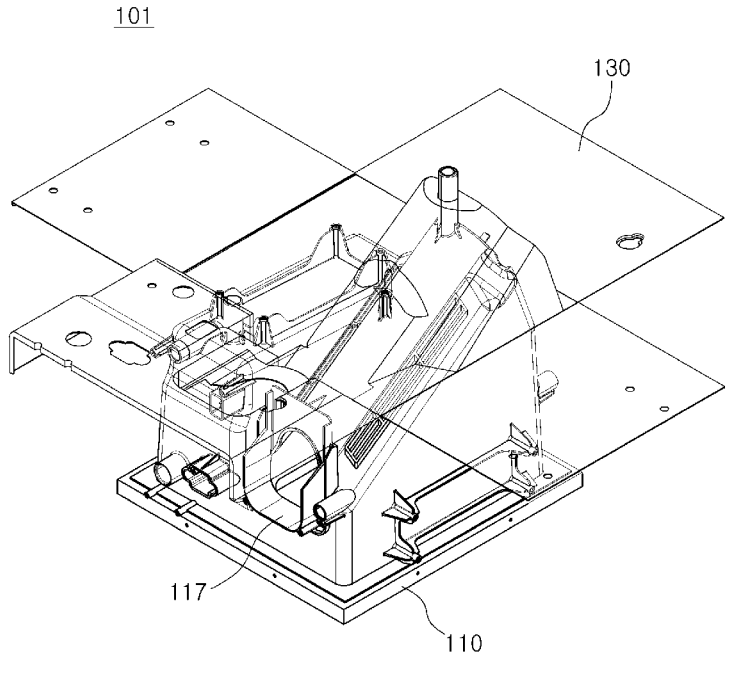
FIG. 6 is a perspective view illustrating a foamed case unfolded so that a shape of a tank body is identifiable in FIG. 5 in a translucent state.
Figure 9:
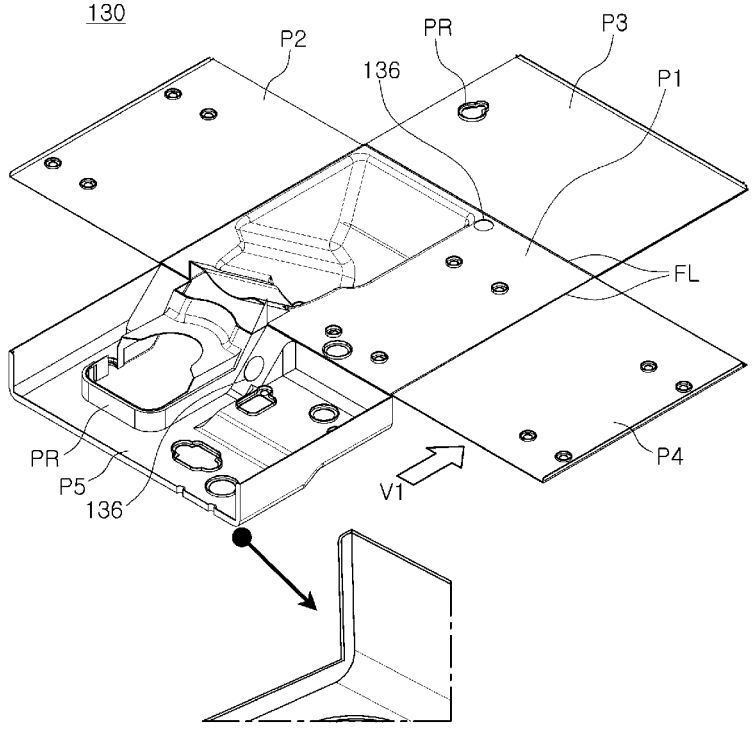
FIG. 9 is an unfolded view of the foamed case illustrated in FIG. 8.
Figure 10A:
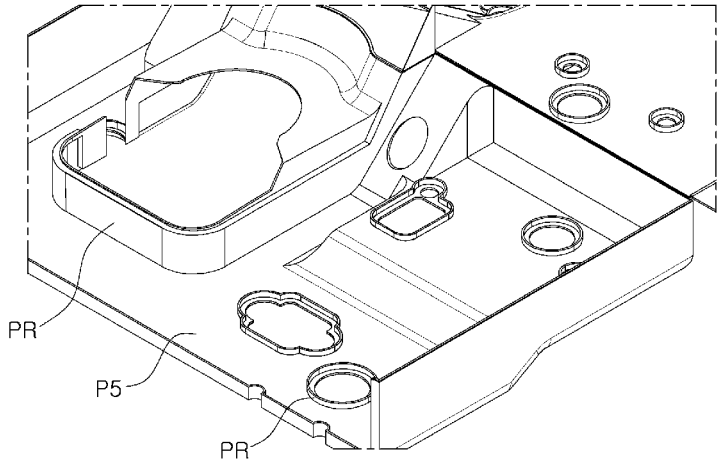
FIG. 10A is an enlarged perspective view of a fifth portion in FIG. 9.
Figure 10B:
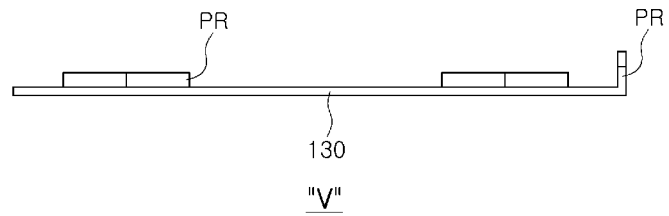
FIG. 10B is a front view viewed from a V1 direction of FIG. 9.

Referring to FIGS. 5, 6, and 9, the foamed case 130 may have five portions P1, P2, P3, P4, and P5 corresponding to five surfaces to surround the remaining five surfaces except for the upper surface. The plurality of portions P1, P2, P3, P4, and P5 may be manufactured in an unfolded view shape and then folded to correspond to the exterior of the tank body.

In this manner, since the foamed case 130 is manufactured in an unfolded view shape and then folded, it is possible to easily manufacture a shape corresponding to each surface of the tank body 110, and accordingly, the foamed case 130 may be easily manufactured even when the tank body 110 has a complicated shape. That is, even when the tank body 110 has a complex shape, such as when the storage tank unit 111 and the ice storage unit 115 are combined, the foamed case 130 corresponding thereto may be easily manufactured.

At this time, the foamed case 130 having an unfolded view shape may be manufactured by a forming process (molding process) using a press or the like. In addition, the foamed case 130 having an unfolded view shape may be formed of a plastic material, such as PET material, so that the foamed case 130 may be easily molded and folded. In this manner, since the foamed case 130 is formed of a plastic material, molding is easy, and since the surface is smooth, the surface may be easily cleaned. That is, even when dew condensation (condensed water) occurs on the surface of the foamed case 130 or there are contaminants, such as mold, cleaning may be easily performed, and contamination of the foamed insulation material 150 located inside the foamed case 130 may be prevented.

At this time, a thickness of the foamed case 130 may be in the range of 0.5 to 1.5 mm (e.g., 1 mm).

Figure 8:
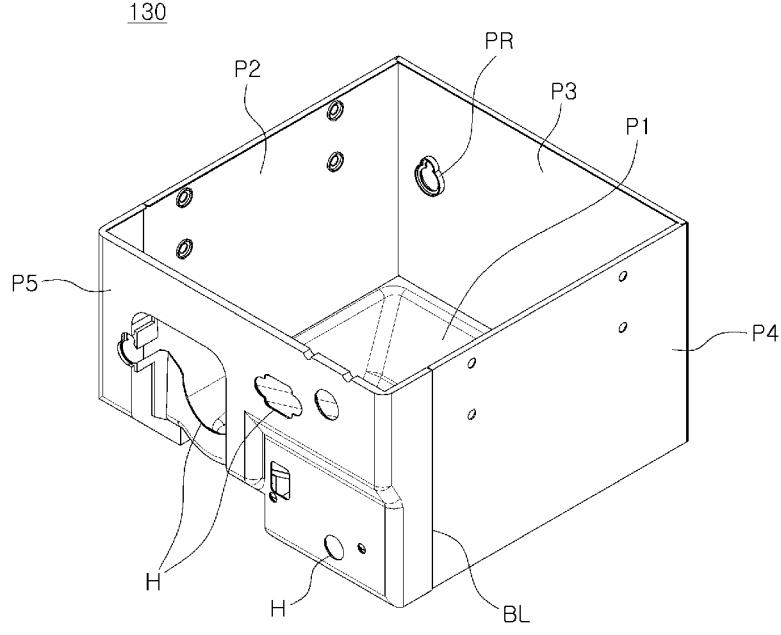
FIG. 8 is a perspective view illustrating a foamed case in the tank having an integrated insulation structure illustrated in FIG. 1.

As such, the foamed case 130 may be manufactured in an unfolded view shape as illustrated in FIG. 9 and then folded based on a fold line FL to have a three-dimensional shape as illustrated in FIG. 8.

Figure 4:
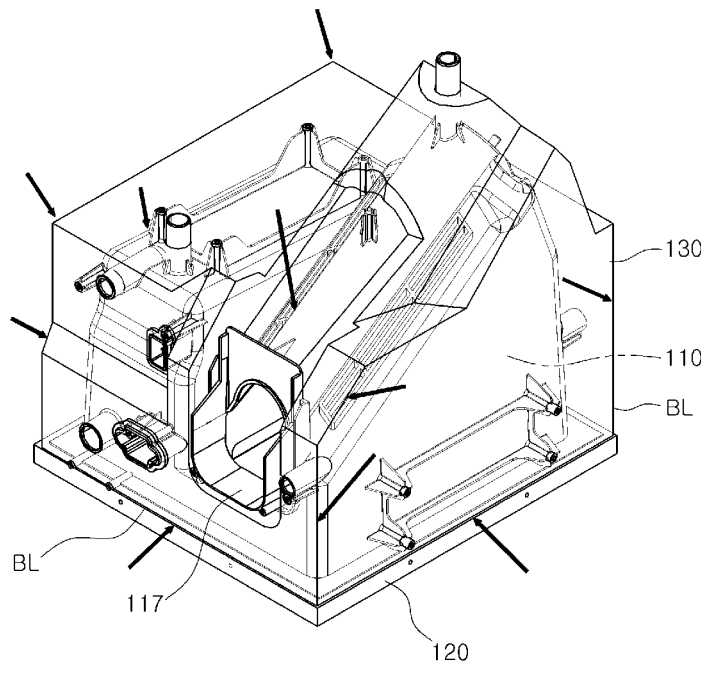
FIG. 4 is a perspective view illustrating a foamed case in a translucent state so that a shape of a tank body in FIG. 2 is identified.
Figure 22:
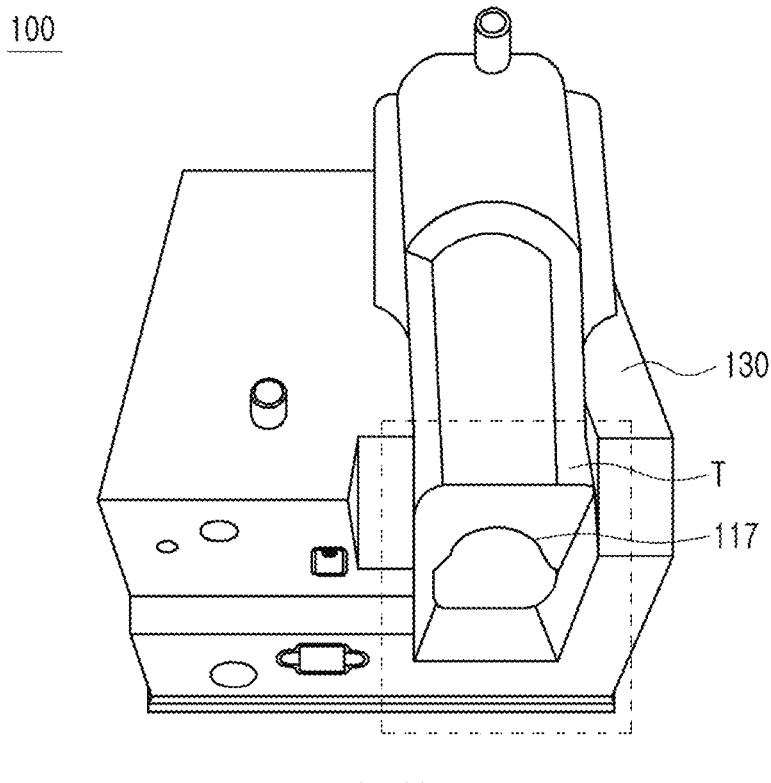
FIG. 22 is a photograph illustrating a product of a tank having an integrated insulation structure according to an exemplary embodiment in the present disclosure.
Figure 23:
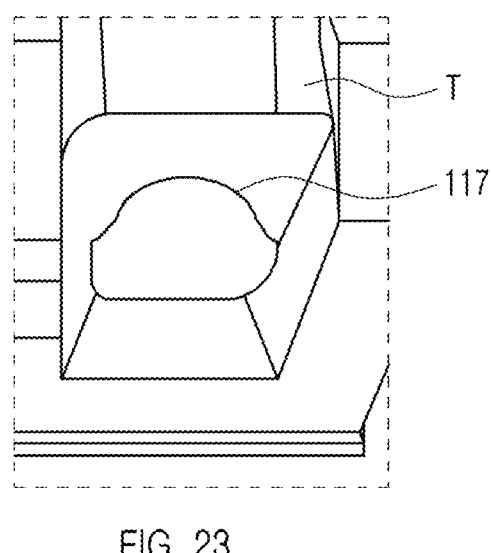
FIG. 23 is an enlarged view of a rectangular box portion of FIG. 22.

A bonding member, such as a tape (T in FIGS. 22 and 23) may be attached to a boundary line BL in which each portion P1, P2, P3, P4, and P5 of the foamed case 130 overlaps in a folded state. In FIG. 4, the arrows indicate portions to which bonding members are to be attached. Since deformation of the outer surface of the foamed case 130 is limited by a foaming jig when the foaming operation is performed, the bonding member T may provide bonding force so that the foamed case 130 is not separated from each other in a process of inserting the foaming assembly 101 into the foaming jig. Therefore, the bonding member T may be formed of a tape attached to the boundary line BL portion, but is not limited thereto. For example, the bonding member T may be formed of an adhesive applied to the boundary line BL portion, and various changes may be made.

In addition, a through-hole H may be formed in the foamed case 130 to correspond to the exposed portion EX of the tank body 110 so that the exposed portion EX is exposed to the outside.

In addition, the foamed case 130 may have a step PR so that the foaming agent FA does not leak between the through-hole H and the exposed portion EX or between an end portion of the foamed case 130 and the tank rim 120. The step PR may have a shape extending from the foamed case 130 toward the tank body 110 by a predetermined height.

Meanwhile, at least a portion of the plurality of portions P1, P2, P3, P4, and P5 of the foamed case 130 may be separately manufactured and combined with the remaining portions. For example, since the fifth portion P5 corresponding to the ice outlet 117 has a complicated structure and shape, the fifth portion may be manufactured separately and then combined with the other portions P1, P2, P3, and P4. At this time, a bonding member, such as a tape, may also be used to couple the fifth portion P5 and the remaining portions P1, P2, P3, and P4.

In this case, since an injection process may form a complex shape relatively accurately and is easy to manufacture a complex shape, the separately manufactured portion (e.g., P5) may be formed by the injection process. At this time, plastic materials, such as PE, LDPE, and PP, may be used to manufacture the separately manufactured portion. In addition, in order to enable manufacturing by the injection process, the separately manufactured portion may have a thickness of 1.5 mm or more (e.g., 1.5 mm) slightly thicker than a portion formed by a forming process.

Meanwhile, when the foamed case 130 is manufactured in an unfolded view shape, the entire unfolded area is considerably large, so a large-capacity forming (molding) machine is required to form the entire portion corresponding to the unfolded view shape at once by the forming process (molding process). In view of this, it is also possible to divide the plurality of portions P1, P2, P3, P4, and P5 of the foamed case 130 into two or more portions, form them, and then combine them through a bonding member, such as tape.

In addition, the foamed insulation material 150 may be formed as a foaming agent FA introduced to a foaming space between the outer circumferential surface of the tank body 110 and the foamed case 130 is foamed. Accordingly, the foamed insulation material 150 may be integrated with the tank body 110 and the foamed case 130 through foaming.

At this time, a foaming agent capable of forming urethane (polyurethane) foam may be used as the foaming agent FA. Polyurethane foam refers to a foam product which is usually formed of polyurethane obtained by the reaction of isocyanate compound and glycol as a constituent material and which is made by mixing carbon dioxide which is produced by the reaction of isocyanate, which is a component, and water used as a bridge binder and volatile solvents such as Freon with a foaming agent FA. Urethane foam may have various hardnesses, such as ultra-soft, soft, semi-hard, and hard, depending on the type of raw material glycol in use. However, when the foaming agent FA used in the present disclosure is able to form a urethane foam, various changes may be made in the composition and manufacturing method of the urethane foam. In addition, the foamed insulation material 150 provided in the tank 100 having an integrated insulation structure of the present disclosure is not limited to urethane foam, and various types of known foaming agents may be used as long as they accommodate the tank body 110 inside the foamed case and perform uniform foaming between the foamed case and the outer surface of the tank body 110.

Figure 3:
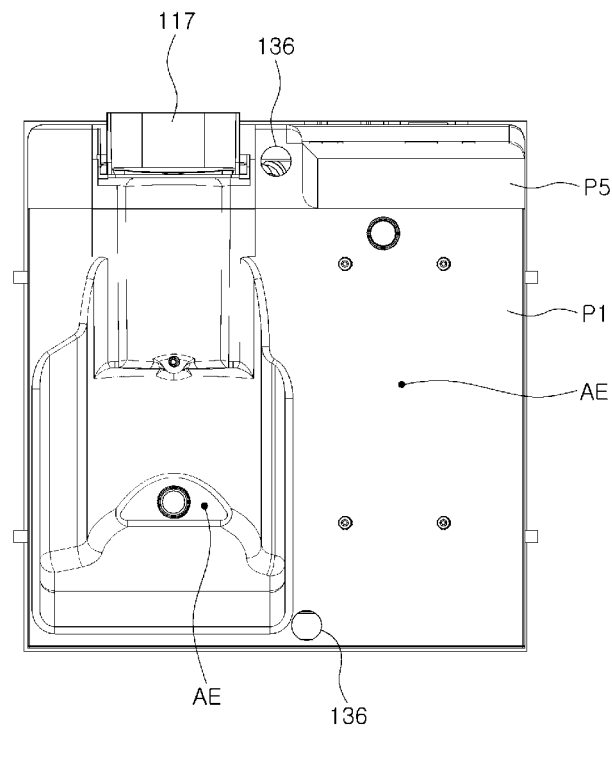
FIG. 3 is a bottom view of the tank having an integrated insulation structure illustrated in FIG. 2.

Meanwhile, the foamed case 130 may have an injection port 136 for injecting the foaming agent FA and an air outlet AE through which air from the foaming space is discharged during the foaming process. At this time, the injection port 136 may be formed on one surface of the foamed case 130, and may have a size necessary for the injection operation. In addition, when the shape of the tank body 110 is complex, as in the exemplary embodiment in the present disclosure, a plurality of injection ports 136 may be formed so that the foaming agent FA may sufficiently flow into the foaming space to fill the foaming space. At this time, the plurality of injection ports 136 may be formed at intervals from each other on the same surface as illustrated in FIG. 3, among the six surfaces of the tank body. For example, as illustrated in FIG. 3, the injection ports 136 may be installed in the first portion P1 corresponding to the lower surface of the tank body 110 and the fifth portion P5, respectively. The injection port 136 may have a shape of a through-hole formed by completely cutting.

In addition, the air outlet AE may be formed on the surface in which the injection port 136 is formed, among the six surfaces of the tank body. For example, as illustrated in FIG. 3, the air outlet AE may be formed in a region (refer to FIGS. 19 and 20) in which filling of the foaming agent occurs most lately in the first portion P1 corresponding to the lower surface of the tank body 110. In addition, the air outlet AE may be installed adjacent to a complex-shaped portion of the foamed case 130 so that sufficient foaming may be performed in the complex-shaped portion.

Also, since the air outlet AE has a relatively large size, the air outlet AE may be blocked using a blocking member (not illustrated). In this case, the blocking member may be formed of a material that prevents the foaming agent FA from leaking and allows air to be discharged during the foaming process. For example, the blocking member may be formed of a non-woven fabric or a mesh network with small gaps. However, the material of the blocking member is not limited thereto, and members of various materials and shapes may be used as long as the members may allow air to be discharged and prevent leakage of the foaming agent FA. In addition, the blocking member may be attached to the inner surface of the foamed case 130, but since the foamed case 130 is supported by the foaming jig during the foaming process, it is also possible to attach the blocking member to the outer surface of the foamed case 130.

In order to easily discharge air, the air outlet AE may have a diameter of approximately 4 mm to 15 mm, more preferably, 4 to 10 mm.

Meanwhile, the air outlet AE may further include an auxiliary outlet (not illustrated) located at the corner (vertex) and/or edge of the foamed case 130. When the foamed case 130 is provided with only a large-sized air outlet AE, air flow is small at the corner (vertex) and/or edge of the foamed case 130, and as a result, an unfoamed region (unfilled region) is likely to occur at the corner (vertex) and/or edge portion. In view of this, the auxiliary outlet may be additionally installed at the corner (vertex) and/or edge of the foamed case 130.

Meanwhile, when the auxiliary outlet is formed to be large, the foaming agent FA may leak through the auxiliary outlet during the foaming process. In view of this, the auxiliary outlet may have a diameter of about 1 mm, preferably, in the range of 0.3 to 2.0 mm, more preferably, 0.5 to 1.5 mm, so that air may be discharged, while leakage of the foamed foaming agent FA is prevented.

Referring to FIGS. 11 to 15, a sealing structure to block leakage of the foaming agent FA may be formed in a coupled portion of the foamed case 130 and the tank body 110. Through the sealing structure, it is possible to prevent the foaming agent FA from leaking to the outside during the foaming process of the foaming agent FA, and after curing of the foaming agent FA is completed to form the foamed insulation material 150, the outer surface of the foamed case 130 and the foamed insulation material 150 may be completely blocked.

As illustrated in FIG. 9, when the foamed case 130 has an unfolded view shape, the plurality of portions P1, P2, P3, P4, and P5 are folded through the fold line FL to form a three-dimensional structure, and in this process, the exposed portion EX of the tank body 100 should be exposed to the outside through the through-hole H of the foamed case 130. However, as illustrated in FIG. 9, since a plurality of through-holes H are formed in the foamed case 130 and their sizes and positions are different, it is not easy to form the sizes of all through-holes H to correspond to the size of the exposed portion EX. Accordingly, a relatively large space may be formed between the through-hole H and the exposed portion EX in consideration of tolerance.

Figure 11:
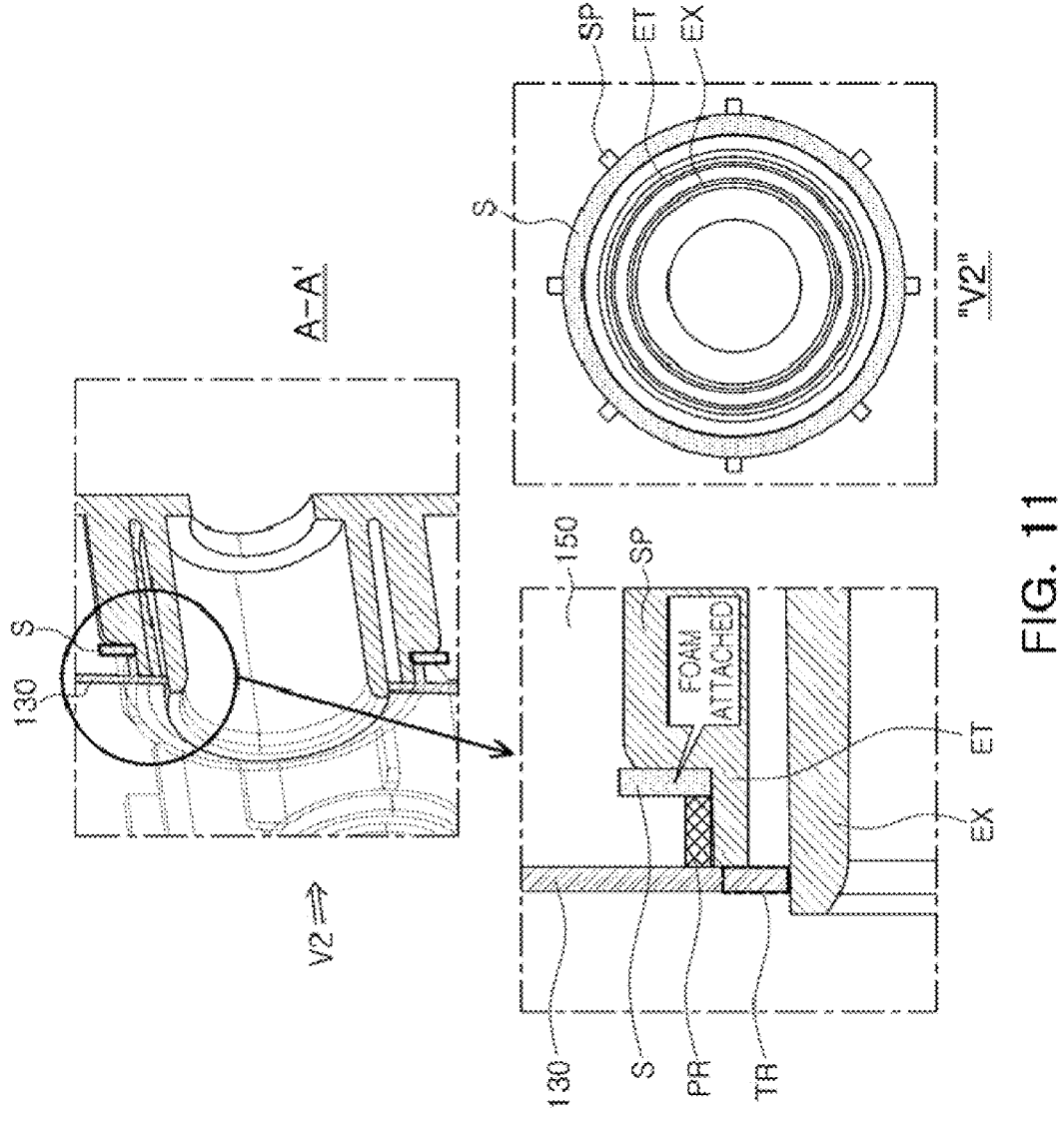
FIG. 11 is a cross-sectional perspective view, a cross-sectional enlarged view, and a front view in a V2 direction of a foaming assembly taken along line A-A' of FIG. 1.

Referring to FIG. 11, in a cross-sectional view at the lower left, a vertical cross-sectional portion of the foamed case 130 has a shape connected to the exposed portion EX, but in reality, a space TR having a sufficient size needs to be formed between the vertical cross-sectional portion of the foamed case 130 and the exposed portion EX in consideration of tolerance. Therefore, the foaming agent FA may leak through the space TR.

Figure 12:
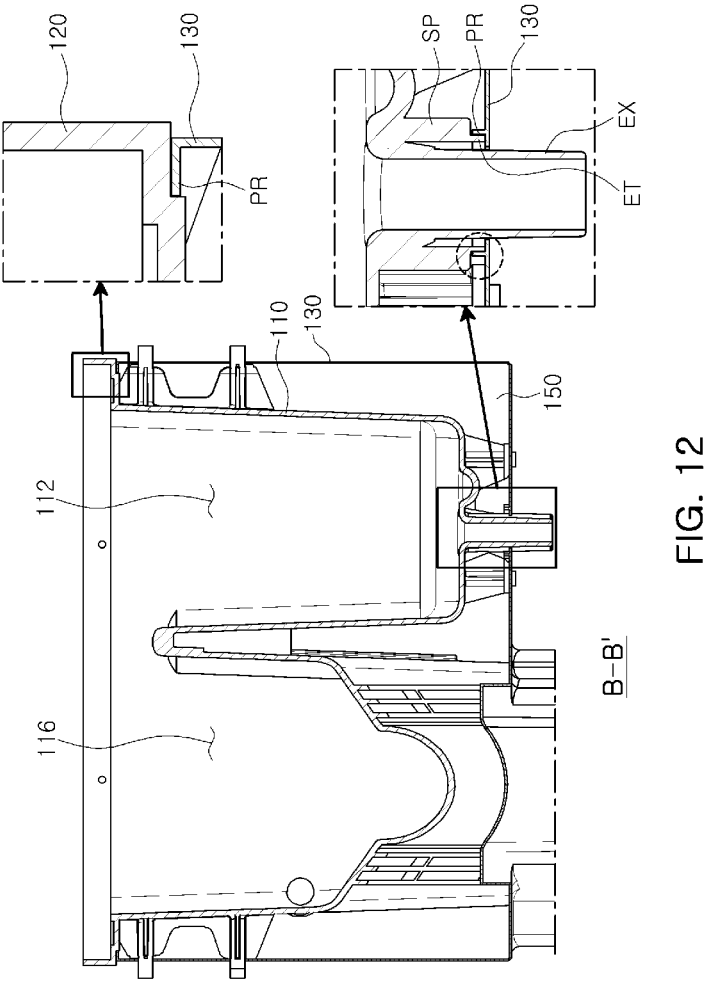
FIG. 12 is a cross-sectional view and a partially enlarged view of a foaming assembly taken along line B-B' of FIG. 1.

In view of this, according to an exemplary embodiment in the present disclosure, as illustrated in the enlarged view of the upper right of FIGS. 11 and 12, a sealing member may be provided in which an extension ET is formed around the exposed portion EX, and a support portion SP for mounting a sealing member S is formed in the extension ET.

At this time, the sealing member SR is configured to implement sealing between a step PR of the foamed case 130 having a shape extending from the foamed case 130 to the tank body 110 and the support portion SP of the tank body 110. The sealing member SR may be formed of foam formed of PE or the like and may have a shape (for example, a quadrangular cross-section) having a large contact area for effective sealing. This foam may form a closed cross-sectional structure that surrounds the exposed portion EX with a large cross-sectional area (e.g., a quadrangular cross-section). In addition, since the shape of the exposed portion EX provided in the tank body 110 has various shapes, such as an elliptical shape, a rectangular shape, a combination of a circular shape and a prismatic shape, as well as a circular shape, the sealing member SR is formed to have a strip shape to have a structure surrounding the circumference of the exposed portion EX between the step PR of the foamed case 130 and the support portion SP. However, an O-ring may also be used as the sealing member SR.

Referring to the enlarged view of the upper right corner of FIG. 12, the tank body 110 has the tank rim 120 corresponding to the open region, and the foamed case 130 may have a jaw portion PR protruding toward the tank body 110 to contact a step formed on the tank rim 120 by a large area. As illustrated in FIG. 12, the jaw portion PR of the foamed case 130 and the tank rim 120 may have a structure in contact with each other on one surface. However, for more reliable sealing, the jaw portion PR of the foamed case 130 and the tank rim 120 may be fitted to each other. For example, by forming a 'C'-shaped cross-section with a recess in the jaw portion PR and forming a 'C'-shaped cross-section with a recess also in the tank rim 120, the configuration may be changed so that both are double-fitted to each other.

Figure 13:
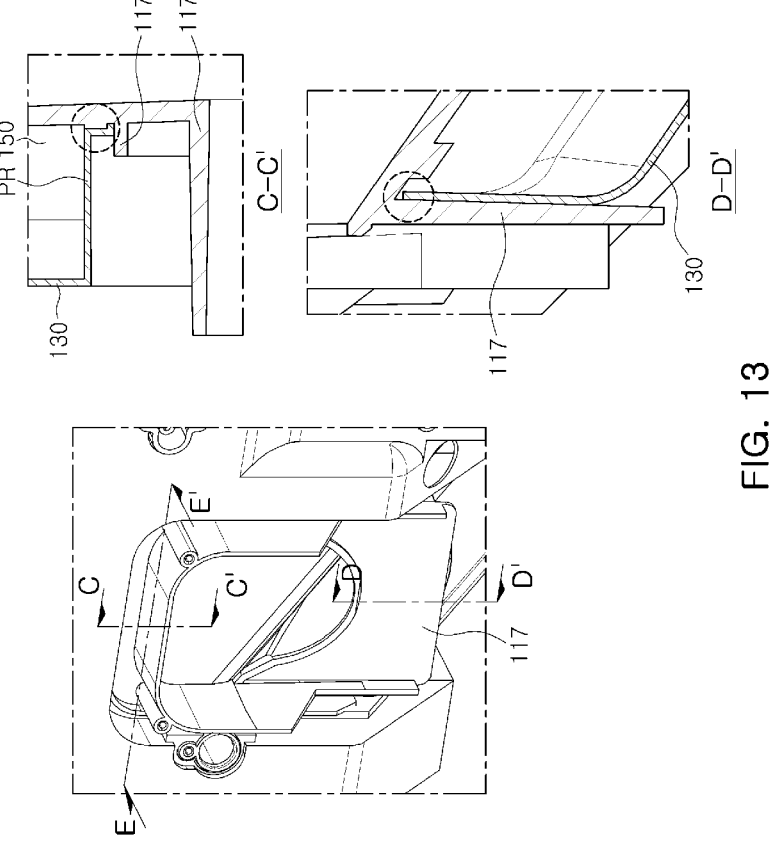
FIG. 13 is an enlarged perspective view of an ice outlet portion of FIG. 1, a cross-sectional view taken along line C-C', and a cross-sectional view taken along line D-D'.
Figure 14:
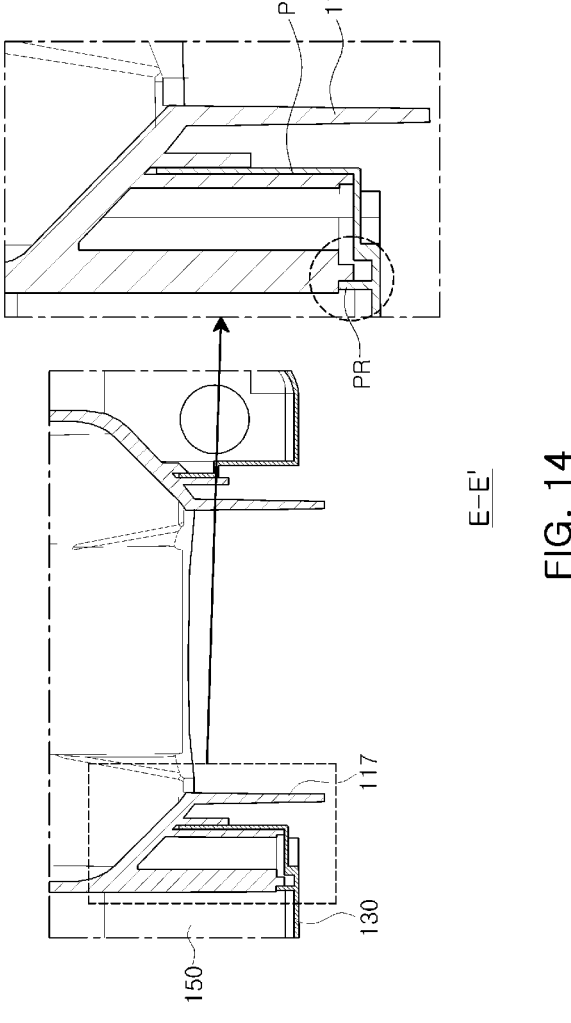
FIG. 14 is a cross-sectional view of a foaming assembly taken along line E-E' of FIG. 13.
Figure 15:
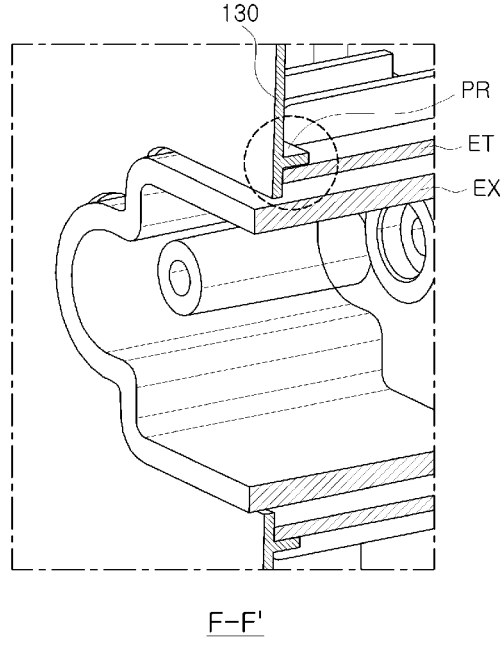
FIG. 15 is a cross-sectional view of a foaming assembly taken along line F-F' of FIG. 1.

Meanwhile, as illustrated in FIGS. 13 and 14, a sealing structure may also be applied between the ice outlet 117 vicinity and the foamed case 130. Although the sealing member SR is not illustrated in FIGS. 13 and 14, the sealing member SR may be installed around the entire ice outlet 117. For example, the sealing member SR formed of foam may be installed in a portion indicated by the red circle. Also, in the case of FIG. 15, the sealing member SR formed of foam may be installed in a portion indicated by the red circle.

[Method of Manufacturing Tank 100 Having Integrated Insulation Structure (S100)]

Next, a method (S100) of manufacturing the tank 100 having an integrated insulation structure according to an aspect of the present disclosure will be described with reference to FIGS. 16 to 21.

Figure 16:
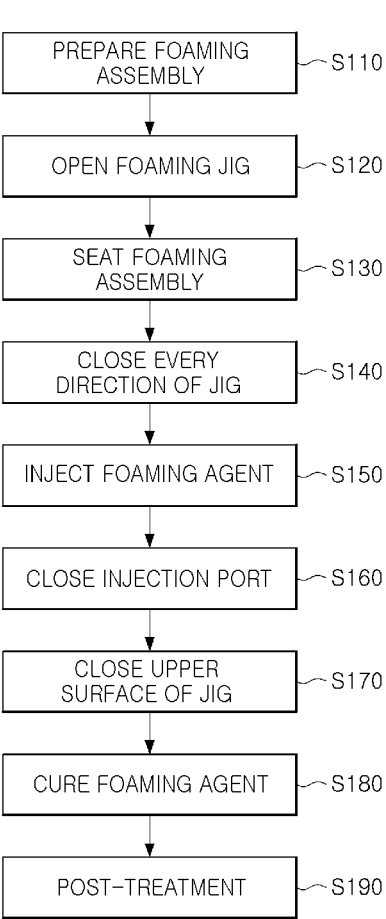
FIG. 16 is a flowchart illustrating a method of manufacturing a tank having an integrated insulation structure according to an exemplary embodiment in the present disclosure.

As illustrated in FIG. 16, the method (S100) of manufacturing the tank 100 having an integrated insulation structure according to an exemplary embodiment in the present disclosure may include a seating operation (S130) of seating the foaming assembly 101 on the foaming jig, a partial closing operation (S140) of closing every part of the foaming jig, an injection operation (S150) of injecting a foaming agent FA, an upper surface closing operation (S170) of closing an upper surface of the foaming jig, and a foaming and curing operation (S180) of foaming and curing the foaming agent FA, and may further include at least some of a preparation operation (S110) of preparing the foaming assembly 101, an opening operation (S120) of opening the foaming jig (not illustrated), an injection port 136 closing operation (S160) of closing the injection port 136, and a post-treating operation (S190) of post-treating and/or inspecting the cured tank 100 having an integrated insulation structure.

As illustrated in FIGS. 2 to 5, the preparation operation (S110) of preparing the foaming assembly 101 is to combine the tank body 110 and the foamed case 130 to form a foaming space between the tank body 110 and the foamed case 130. At this time, the exposed portion EX, such as the ice outlet 117 provided in the tank body 110, may be exposed to the outer surface of the foamed case 130 through the through-hole H provided in the foamed case 130. In addition, the sealing member SR may be installed between foamed case 130 and the exposed portion EX.

Meanwhile, the operation (S110) of preparing the foaming assembly 101 may include a process of blocking the air outlet AE having a relatively large size using a blocking member. At this time, the blocking member may be formed of a material that prevents the foaming agent FA from leaking and allows air to be discharged. As an example, a non-woven fabric may be used. In addition, the blocking member may be attached to the inner surface of the foamed case 130, but since the foamed case 130 is supported by the foaming jig during the foaming process, it is also possible to attach the blocking member to the outer surface of the foamed case 130.

Meanwhile, since the foamed case 130 has a structure in which at least some of the plurality of portions P1, P2, P3, P4, and P5 are manufactured in an unfolded view shape and then folded to correspond to the exterior of the tank body 110, an operation of bonding a bonding member T, such as a tape, to a region corresponding to the boundary line BL of a plurality of portions may be included.

In the foaming and curing operation (S180) described later, since deformation of the outer surface of the foamed case 130 is limited by the foaming jig, the bonding member T may sufficiently provide bonding force so that the foamed case 130 is not separated from each other in the process of inserting the foaming assembly 101 into the foaming jig.

Figure 17:
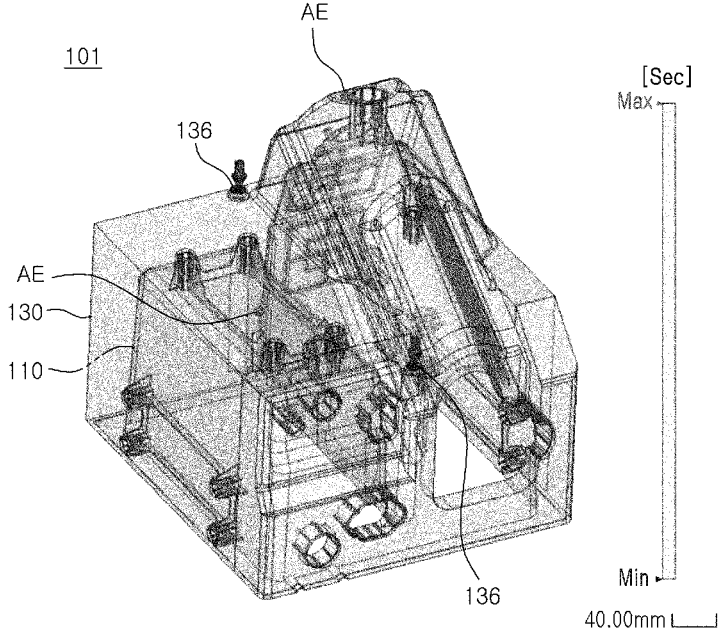
FIG. 17 is a translucent perspective view of a foaming assembly illustrating a state before a foaming agent is introduced.

Next, in the opening operation (S120) of opening the foaming jig, a space into which the foaming assembly 101 is inserted is open so that the foaming assembly 101 may be seated in the foaming jig. At this time, the foaming jig may have a structure divided into a plurality of portions to have an inner shape corresponding to the outer shape of the foaming assembly 101. However, the shape and number of divided portions of the foaming jig may vary depending on the shape of the foaming assembly 101, and for example, when the foaming assembly 101 has a cylindrical shape, the foaming jig may have a shape and a divided structure supporting a circumferential surface and upper and lower surfaces of the cylinder. For convenience of description, a case in which the foaming assembly 101 has a hexahedral shape and the foaming jig has a corresponding 6-sided support structure will be described below. As illustrated in FIG. 17, when the foaming assembly 101 has a hexahedral shape, the foaming jig may have a divided structure to support six sides of the front, rear, left, and right, and upper and lower sides of the foaming assembly 101. Therefore, in the opening operation (S120), the upper surface of the foaming jig may be open and the front, rear, left, and right sides of the foaming jig may be spaced apart at least partially from the foaming assembly 101 so that the foaming assembly 101 may be easily inserted into the foaming jig. At this time, the front, rear, left and right sides of the foaming jig may be open in a form in which the upper portion is open in an outward direction by rotating with respect to the lower side, but is not limited thereto, and the front, rear, left, and right sides may move in an outward direction as a whole based on the foaming assembly 101.

In the seating operation (S130) of seating the foaming assembly 101 on the foaming jig, the foaming assembly 101 is seated on the foaming jig through the open upper surface of the foaming jig.

When the foaming assembly 101 is seated in the foaming jig, the partial closing operation (S140) of closing a portion of the foaming jig is performed. In the partial closing operation (S140), the front, rear, left, and right sides of the foaming jig open in the opening operation (S120) come into contact with the front, rear, left, and right outer circumferential surfaces of the foaming assembly 101 to support the front, rear, left, and right outer circumferential surfaces of the foaming assembly 101. Therefore, it is possible to prevent deformation of the foaming assembly 101 during foaming of the foaming agent FA in the foaming and curing operation (S180) to be described later.

Figure 18:
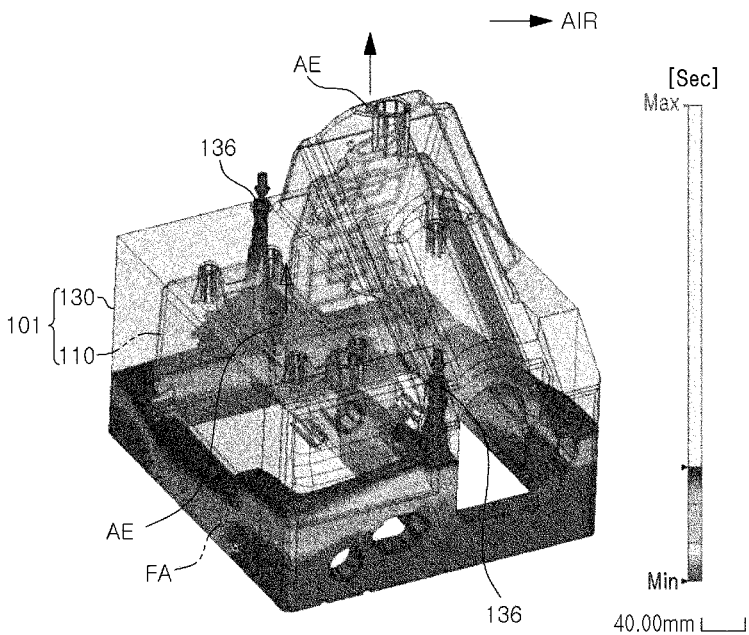
FIGS. 18 to 20 are translucent perspective views sequentially illustrating a process in which a foaming agent is introduced into a foaming assembly.

Thereafter, the injection operation (S150) of injecting the foaming agent FA into the foaming assembly 101 is performed. In the injection operation (S150), the foaming agent FA is injected through the injection port 136 of the foamed case 130 as illustrated in FIG. 18. At this time, a foaming agent capable of forming urethane (polyurethane) foam may be used as the foaming agent FA. Polyurethane foam refers to a foam product which is usually formed of polyurethane obtained by the reaction of isocyanate compound and glycol as a constituent material and which is made by mixing carbon dioxide which is produced by the reaction of isocyanate, which is a component, and water used as a bridge binder and volatile solvents such as Freon with a foaming agent FA. Urethane foam may have various hardnesses, such as ultra-soft, soft, semi-hard, and hard, depending on the type of raw material glycol in use. In addition, as a foam molding method, a one-shot method and a prepolymer process are used. Among them, the prepolymer process is a method in which a portion of glycol reacts with diisocyanate in advance to form a prepolymer (partial polymer), with which the rest of the glycol, foaming agent FA, catalyst, etc., are mixed to perform foaming, and it is suitable for use as the foamed insulation material 150 because the foam is even. However, when the foaming agent FA used in the present disclosure is able to form a urethane foam, the composition and manufacturing method of the urethane foam are not limited thereto. In addition, the foamed insulation material 150 provided in the tank 100 having an integrated insulation structure of the present disclosure is not limited to urethane foam, and various types of known foaming agents FA may be used as long as they accommodate the tank body 110 inside the foamed case and perform uniform foaming between the foamed case and the outer surface of the tank body 110.

The injection operation (S150) may be performed for a predetermined foaming agent FA input time (for example, a value selected from among 1.3 to 1.7 seconds) in consideration of an injection speed and pressure of the foaming agent FA, so that a predetermined amount of foaming agent FA may be injected into the foaming space to correspond to the foaming space. In this manner, by performing the injection of the foaming agent FA according to certain conditions, the foamed insulation material 150 may have a certain quality (e.g., a certain density). In particular, when the density of the foamed insulation material 150 is formed to be 0.065 to 0.085 $g/cm^3$ after completion of curing, an unfoamed region does not occur and insulation performance and dew condensation performance may be sufficiently secured, and thus, the amount of the foaming agent FA and a corresponding foaming agent FA input time may be set so that the density of the foamed insulation material 150 is 0.065 to 0.085 $g/cm^3$.

The injection operation (S150) may be performed using a urethane high-pressure foaming machine (not illustrated), and as an example of the foaming agent FA, a material in which BILLYOL (RF-334T) and ECO FOAM-A are mixed at a certain ratio (e.g., 1:1.1 to 1.2) may be used.

When the injection of the foaming agent FA is completed, the injection port closing operation (S160) of closing the injection port 136 may be additionally performed. When the injection of the foaming agent FA into the foaming space starts, foaming of the foaming agent FA is performed in the foaming space, and after the injection of the foaming agent is completed, an operation of closing the injection port 136 may be performed to prevent the foaming agent FA from being exposed to the outside through the injection port 136. The injection port 136 closing operation (S160) may be performed by closing the injection port 136 portion of the foamed case 130 with a stopper member (not illustrated), and tape may be used as the stopper member BM, for example, to easily perform the operation. However, the stopper member BM is not limited thereto and may be changed into various materials and shapes as long as the injection port 136 may be easily closed.

In this manner, after the injection operation (S150) is completed or after the injection operation (S150) and the injection port 136 closing operation (S160) are completed, the upper surface closing operation (S170) of closing the upper surface of the foaming jig is performed.

Also, after the upper surface closing operation (S170), the foaming and curing operation (S180) of foaming and curing the foaming agent FA is performed.

Figure 19:
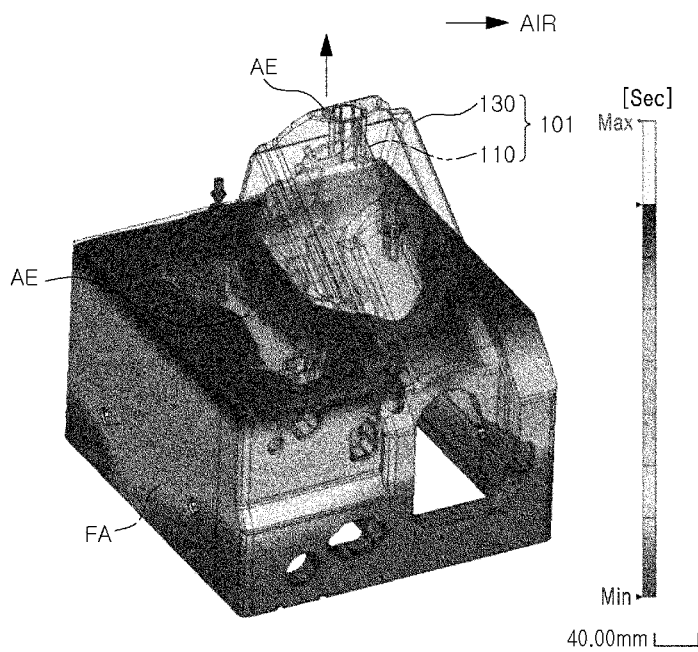
Figure 20:
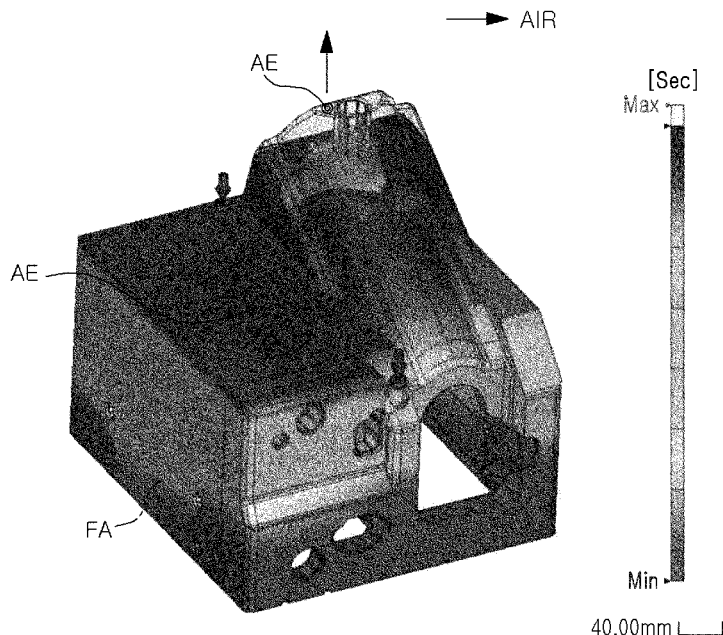

When the injection of the foaming agent FA into the foaming space starts, foaming of the foaming agent FA is performed in the foaming space, and accordingly, as illustrated by the arrows in FIGS. 18 to 20, air inside the foaming space is discharged to the outside through the air outlet AE. At this time, in the foaming and curing operation (S180), the position of the air outlet AE may be set so that the foaming agent FA completely fills the foaming space so that an unfoamed non-foamed space is not formed. In particular, by forming an auxiliary outlet (not illustrated) in a portion corresponding to the corner and/or edge of the foamed case 130, complete foaming may be performed up to the corner and/or edge portion of the foamed case 130. At this time, the auxiliary outlet may have a diameter of about 1 mm, preferably, in the range of 0.3 to 2.0 mm, and more preferably, in the range of 0.5 to 1.5 mm, so that the air may be discharged but the foamed foaming agent FA may be prevented from leaking.

The foaming and curing operation (S180) may be performed for a predetermined time (e.g., 20 minutes±2 minutes) so that the foaming agent FA is completely foamed and the foam is cured.

Meanwhile, in order to ensure smooth foaming, the foaming jig may be maintained at a predetermined temperature (e.g., 40° C.±5° C.). To this end, the foaming jig may be configured to be maintained at a predetermined temperature from the opening operation (S120) until a subsequent process is performed.

Figure 21:
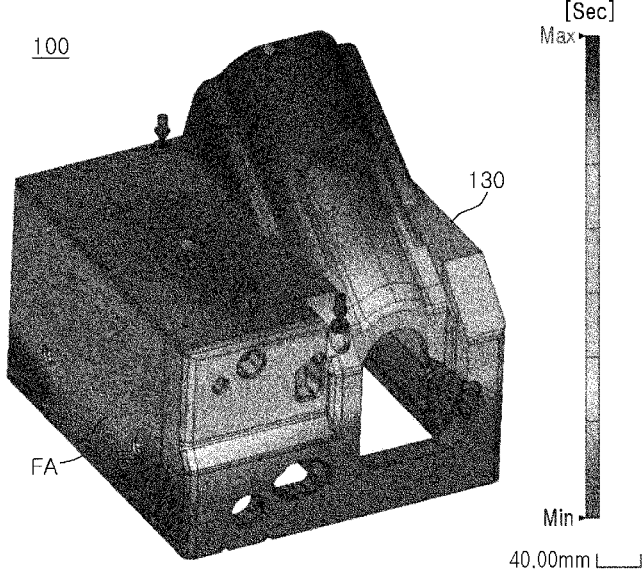
FIG. 21 is a translucent perspective view illustrating a state in which injection of a foaming agent into a foaming assembly is completed.

Also, when the foaming and curing operation (S180) is completed, the manufacture of the tank 100 having an integrated insulation structure is completed as illustrated in FIG. 21. Thereafter, the post-treating operation (S190) of post-treating and/or inspecting the cured tank 100 having an integrated insulation structure may be performed. In the post-treating operation, an inspection operation of inspecting the exterior of the tank 100 having an integrated insulation structure, an operation of removing burrs that may partially occur during foaming, a sanding and air cleaning operation, and a packaging operation may be performed.

Meanwhile, since the foamed case 130 is provided with the injection port 136 and the air outlet AE, a post-treating operation of sealing the injection port 136 and the air outlet AE with a filler formed of a material, such as silicon or hot melt in order to prevent the foamed insulation material 150 from contacting the outside air through such a space.

In this manner, in the method of manufacturing the tank 100 having an integrated insulation structure, foaming is performed by injecting the foaming agent FA into the foaming space formed between the foamed case 130 and the tank body 110 using the foamed case 130 and leakage of a foaming liquid is blocked as much as possible, thereby minimizing quality problems in which the foaming powder flows into the internal space of the tank, and since the foamed insulation material 150 is completely blocked from the outside space through the foamed case 130, problems in which mold or bacteria propagate inside the foamed insulation material 150 may be prevented. In addition, insulation performance and anti-dew condensation performance may be sufficiently secured through the foamed insulation material 150.

Although the exemplary embodiments in the present disclosure have been described in detail above, the scope of the present disclosure is not limited thereto, and it may be obvious for those skilled in the art that various modifications and variations may be made without departing from the technical spirit of the present disclosure described in the claims.

The invention claimed is:

1. A water purifier comprising:
a filter unit filtering introduced raw water to generate purified water;
a tank having an integrated insulation structure storing water filtered by the filter unit; and
an extraction unit supplying purified water accommodated in the tank having an integrated insulation structure to a user,
wherein the tank comprising:
a tank body having an accommodating space formed therein;
a foamed case surrounding an outer circumferential surface of the tank body; and
a foamed insulation material formed as a foaming agent introduced to a foaming space between the outer circumferential surface of the tank body and the foamed case is foamed,
wherein the foamed insulation material is integrated with the tank body and the foamed case through foaming,
the foamed case includes a plurality of portions surrounding the tank body, and
at least some of the plurality of portions has a structure manufactured in an unfolded view shape to be folded thereafter to correspond to the outer circumferential surface of the tank body.

2. The water purifier of claim 1,
wherein the foamed case is configured such that the remaining portions of the plurality of portions, which are not manufactured in the unfolded view shape, are divided to be manufactured from the portions manufactured in the unfolded view shape and then combined with the portions manufactured in the unfolded view shape.

3. The water purifier of claim 2, wherein the portion manufactured in the unfolded view shape, among the plurality of portions, and the portion being divided to be manufactured are formed of different materials.

4. The water purifier of claim 1, wherein a portion manufactured in the unfolded view shape is formed by a forming process.

5. The water purifier of claim 2, wherein the portion being divided to be manufactured is formed by an injection process.

6. The water purifier of claim 2, wherein the portion manufactured in the unfolded view shape, among the plurality of portions, and the portion being divided to be manufactured have different thicknesses.

7. The water purifier of claim 1, wherein the tank body includes a storage tank accommodating purified water and an ice storage storing ice.

\* \* \* \* \*